Nov. 11, 1969     A. G. BOS     3,477,751
PANEL CLAMPING DEVICE
Filed Sept. 5, 1967
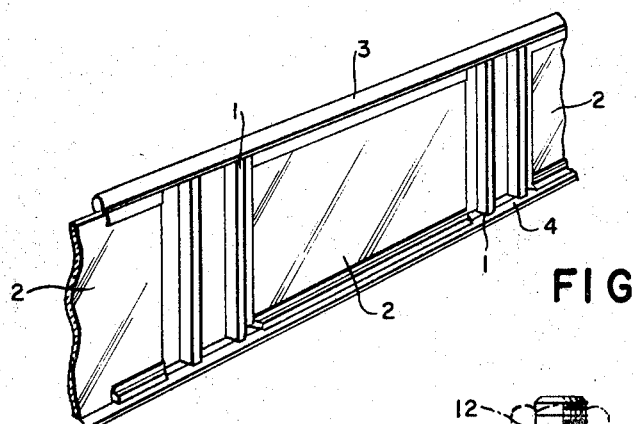
FIG.1.
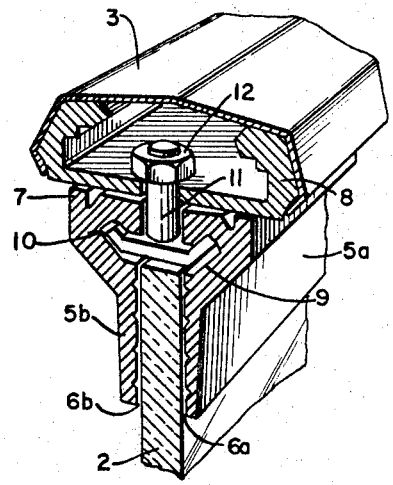
FIG.2.
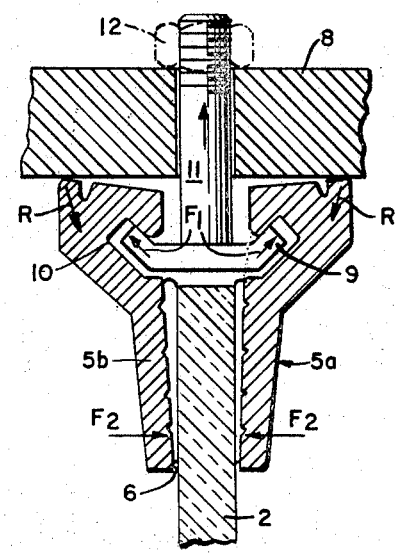
FIG.3.
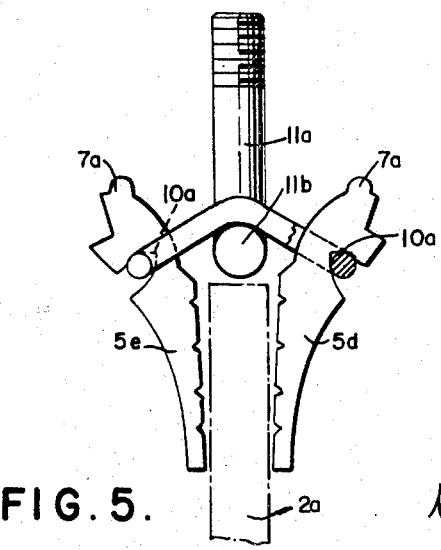
FIG.5.
FIG.4.
INVENTOR
A. G. Bos
BY Wilkinson, Mawhinney & Theibautt
ATTORNEYS

United States Patent Office 3,477,751
Patented Nov. 11, 1969

3,477,751
PANEL CLAMPING DEVICE
Andre Gerard Bos, 64 Avenue de Lardenne,
Toulouse, Haute-Garonne, France
Filed Sept. 5, 1967, Ser. No. 665,565
Claims priority, application France, Sept. 27, 1966,
77,752
Int. Cl. F16b 1/00, 3/00, 5/00
U.S. Cl. 287—189.36   5 Claims

ABSTRACT OF THE DISCLOSURE

The present invention relates to a panel clamping device and is directed more particularly to the use of two clamping jaws, one of which is placed on opposite sides of the panel to be clamped. The jaw members have undercut recesses which cooperate with clamp actuating means in the form of a threaded bolt, which is received through an opening in a support member intended to support the panel in which the bolt member has a head like projection which cooperates with the undercut portions of the two clamping jaw members to draw the two clamp members upward across the support. The top portion of each clamp member has support engaging members which are beveled to cause remote portions of the clamps which define clamping jaws to engage opposite sides of panel to be mounted in the support. In one embodiment the undercut portions in the upper portions of each clamp member are adjacent but spaced from one another. In another embodiment of the invention, the clamp actuating means is a bolt having a T-shaped head wherein a closed rectangular link which has the long sides of the rectangle bent to define an apex rests upon the T portion of the head and wherein the short sides of the rectangle engage the undercut portions in each clamp number 1 are directed outward of the panel to be clamped.

---

Common to both embodiments when the threaded bolt is passed through an opening in the web of a support member and a nut is placed thereon upon tightening the nut over the threads of the bolt, the two clamp members are raised against the support member and are caused to rock about pivot points which compel the lower ends of the clamp members which define the clamping jaws to be forced together to rigidly clamp opposite sides of the panel to be clamped to the support member.

The present invention relates to a device which permits the convenient attachment of an element to a support, a device of this type being advantageously applicable to the construction of gridwork elements and balustrades comprising panels.

It is further concerned with a sectional member which is intended to be cut into lengths so as to form the essential elements of an assembly device of this type. Finally, it is concerned with a gridwork element, especially a balcony balustrade and comprising panels attached to two rails by virtue of an assembly device of this type.

Gridwork elements and especially balustrades of balconies and stairways are known which comprise panels of various materials which are mounted on rails constituted by sectional members.

However, in the construction of gridwork elements of this type, difficulties are involved in uniformly clamping the edge of a panel between fastening abutment members and counter-abutment members mounted on a rail, thereby entailing high labor costs.

Moreover, it is particularly difficult when employing such abutment-type fastening means to effect the economic assembly of a panel in the longitudinal mid-plane of two rails in order to obtain a balustrade having an attractive appearance.

The present invention has for its object to remedy this disadvantage.

To this end, an assembly device has been devised which is both simple, inexpensive to produce and whereby an element such as a panel can be mounted in a convenient manner on a support and in particular on a sectional member.

A device of this type essentially comprises jaws, means for fixing the said jaws on a support and means for closing these jaws over an element to be attached to the support.

In accordance with the invention, the means for closing the jaws are incorporated with the means for fixing these latter.

It is apparent that a device of this type will make it possible to effect simultaneously the fixing and clamping of the jaws and consequently to effect the rapid assembly of panels on supports, especially on the rails of a gridwork element or balustrade.

Preferably, each jaw is constituted by one of the end portions of a lever, the other end of which is so arranged as to bear on one face of the support and thus to constitute the fixed point of this lever.

Such a mode of construction is obviously simple; moreover, jaws of this type could be disposed symmetrically on each side of the longitudinal med-plane of a rail so as to form a symmetrical assembly.

Furthermore, it will be possible without any particular difficulty to effect the assembly by thus rigidly clamping together both rails and panels whose thickness can be comprised within a relatively wide range.

The invention is additionally concerned with a sectional member which is intended to be cut into lengths so as to constitute in a very economic manner the levers of an assembly device of this type.

Finally, the invention is concerned with a grid-work element, especially a balustrade either of a balcony or stairway, comprising panels which are attached at intervals to two rails by means of assembly devices mentioned above.

Moreover, the device of the invention can be very readily adapted to the case in which the panels to be attached do not withstand excessive clamping; this is the case, for example, of some glass panels in which internal stresses produced by annealing do not readily permit of adaptation to such a clamping action. Provision is in that case made for sectional assembly members of greater rigidity having jaws which do not close in such a manner as to apply strong pressure but which, on the contrary, leave a clearance for the purpose of wedging the panel in position by means of a filling material such as, for example, putty.

Further characteristic features and advantages of the invention will be brought out by the description which follows below in reference to the accompanying drawings, the said description and drawings being given solely by way of non-limitative example.

In these drawings,

FIGURE 1 illustrates in perspective and with parts broken away a balcony balustrade in accordance with the invention.

FIGURES 2 and 3 illustrate on a larger scale and in transverse cross-section with parts broken away an assembly device in accordance with the invention.

FIGURE 4 is a prospective view of a modified form of the clamp assembly device constructed in accordance with the present invention.

FIGURE 5 is a vertical section taken through the embodiment of FIGURE 4 in a view similar to FIGURE 3.

In FIGURE 1, there can be seen bars 1 and panels 2 which are joined to a top rail 3 and to a bottom rail 4 so as to constitute a balustrade.

The bars 1 and the rails 3 and 4 are constituted by sectional members having longitudinal planes of symmetry, and the panels 2 can be readily attached along their longitudinal edges to these rails 3, 4 by virtue of a device which is illustrated in FIGURE 2.

In fact, the top edge of a panel 2 is clamped between jaws which are provided on the end portions of two clamp members 5a, 5b which are identical with each other; plates 6a, 6b of isobutyl being interposed between these jaws and the corresponding faces of the panel so as to provide a remedy for any possible irregularities in thickness of this latter or any possible deformations of their edges as a result of handling shocks or alternatively as a result of deformations which might be attended by temperature variations.

The extremity of each clamp member 5 which is remote from the jaw is provided with a head or support engaging member which bears on the web 8 of the rail or support member by virtue of hooked ends or clamp member engaging elements 9 which are engaged at intervals in a longitudinal groove or undercut area 10 formed in the sectional member; each hooked end is integral with a traction rod or clamp actuating means 11 which is engaged in a hole formed through the web 8 and which is fixed on this latter by means of a nut 12.

It is therefore understood that each clamp number constitutes the point of applicaiton of forces and a head 7 which constitutes the fixed point (FIGURE 3).

By tightening the screw 12, it is in fact possible to apply on the rod 11 a tractive force T which in turn applies on the articulation clamping efforts F1; these produce as a result of reaction R of the heads 7 pivotal-motion forces F2 so as to close the jaws against the edge of the panel 2.

Furthermore, the rod 11 with hooked ends or clamp member engaging elements 9 constitutes the element which secures the levers to the support 8 and also the element which closes the jaws of these levers.

It will be noted that the groove or undercut 10 of the clamp members 5 has a wide opening on the clamping face of the sectional member in order that (when the nut 12 is slackened off) each clamp member 5 can readily be engaged on each side of the panel 2 over the hooked ends 9.

Moreover, these hooked fastening members could advantageously be disposed in the central plane of symmetry of a rail so as to obtain a symmetrical assembly.

Finally, it is understood that the incorporation of means for closing the jaws with the means for securing these latter to their support makes it possible on assembly to achieve appreciable savings in time.

It will also be noted that the clamp members 5 can advantageously be formed by industrial processes such as extrusion or drawing and can be cut into lengths so as to form economically the assembly levers of the device referred-to above.

In addition, the members comprising traction rods and hooked ends can economically be formed by die-stamping or by moulding.

Within the scope of the invention, it will be possible to reduce the length of each strip section to a value corresponding to the dimension of these hooked members; there would thus be formed clips, the levers of which would be pivoted on their fastening member.

It would also be possible to provide longitudinal articulations of a conventional type comprising spindles formed on the arms of a yoke which is intended to cooperate with a traction rod for the purpose of attaching panels to a rail.

Finally, in the case of narrow levers, the articulation recesses could be open on the faces opposite to the clamping faces of the jaws (FIGURE 4).

Referring now to the embodiment illustrated in FIGURES 4 and 5, the rod or clamp actuating bolt 11a has a T-shaped head, 11b with portions extending to each side of the main bolt shaft. A rectangular link member having long sides 9a and short sides 9c is bent to have an apex 9b which rides upon the closed head 11b. Each of the clamping members 5d and 5e have undercut portions 10a, which are undercut and are positioned outwardly of the panel 2a to be clamped by the members 5d and 5e. At the top portion of each of the clamp members 5d and 5e are the support-engaging projections 7a, which abut the web of the support member 8 in a manner similarly illustrated in FIGURE 3 as being applicable to that embodiment.

What I claim is:

1. For use with an overhead beam having a substantially flat free under surface, a hanger member supported from the beam for substantially vertical adjustment, a pair of cooperative clamp members having clamping jaws at lower portions thereof adapted to close in opposite directions upon a panel and head portions having upstanding fulcra on upper outer parts thereof positioned to be fitted freely against the under surface of the beam for relative rocking movements of the members mutually away from and toward the panel, said head portions having undercut parts opening generally downwards, and means supported by and movable up and down with the hanger member for entering the undercut parts of the head portions to support the clamping members while permitting same to rock about their fulcra.

2. The combination of claim 1 in which said means comprises a cross member having end parts inferior in dimensions to the dimensions of the undercut parts to permit limited movements of the clamp members relative to the cross member.

3. The combination of claim 1 in which the undercut parts open through the inner faces of the clamp members and said means includes a cross member having hooked ends for loosely fitting the undercut parts.

4. The combination of claim 3 in which the undercut parts are longer horizontally and deeper than the hooked ends of the cross member to permit complete freedom of the clamp members in rocking about their respective fulcra.

5. The combination of claim 1 wherein the undercut parts open through outer faces of the clamp members and said means comprises a pair of yokes carried by the hanger member looped about the respective clamp members and having outer cross bars occupying the undercut parts and about which the clamp members are free to rotate and to move up and down.

References Cited

UNITED STATES PATENTS

| | | | |
|---|---|---|---|
| 227,210 | 5/1880 | Black | 269—239 |
| 1,906,874 | 5/1933 | Platt | 24—257 |
| 2,102,247 | 12/1937 | Whelan | 52—483 |
| 2,213,402 | 9/1940 | Lowry | 52—463 |
| 2,605,869 | 8/1952 | Backman | 52—499 |
| 3,121,261 | 2/1964 | Ritter | 52—624 |

FRANK L. ABBOTT, Primary Examiner

SAM D. BURKE III, Assistant Examiner

U.S. Cl. X.R.

24—73, 263, 248; 52—500, 698, 713; 256—24; 269—239; 287—20